(12) United States Patent
Derocher et al.

(10) Patent No.: US 11,001,292 B2
(45) Date of Patent: May 11, 2021

(54) ENERGY ABSORBING ASSEMBLY OF A TELESCOPING STEERING COLUMN

(71) Applicant: STEERING SOLUTIONS IP HOLDING CORPORATION, Saginaw, MI (US)

(72) Inventors: Robert C. Derocher, Essexville, MI (US); Leslie E. Edmundson, Clio, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 176 days.

(21) Appl. No.: 16/275,404

(22) Filed: Feb. 14, 2019

(65) Prior Publication Data

US 2019/0300042 A1    Oct. 3, 2019

Related U.S. Application Data

(60) Provisional application No. 62/651,455, filed on Apr. 2, 2018.

(51) Int. Cl.
*B62D 1/19*        (2006.01)
*B62D 1/181*       (2006.01)
*B62D 1/185*       (2006.01)

(52) U.S. Cl.
CPC ............. *B62D 1/192* (2013.01); *B62D 1/181* (2013.01); *B62D 1/185* (2013.01)

(58) Field of Classification Search
CPC ................................ B62D 1/185; B62D 1/192
See application file for complete search history.

(56) References Cited

U.S. PATENT DOCUMENTS

| 3,945,662 | A | * | 3/1976 | Murase | B62D 1/11 280/777 |
| 4,805,478 | A | | 2/1989 | Beauch | |
| 5,476,284 | A | * | 12/1995 | DuRocher | B62D 1/192 188/371 |
| 7,641,214 | B2 | * | 1/2010 | Kahl | B60D 1/52 280/446.1 |

(Continued)

FOREIGN PATENT DOCUMENTS

| DE | 102018201216 A1 * | 7/2018 | ............. B62D 1/184 |
| EP | 3124355 A2 * | 2/2017 | ............. B62D 1/185 |

(Continued)

*Primary Examiner* — Nicole T Verley
(74) *Attorney, Agent, or Firm* — Dickinson Wright PLLC

(57) ABSTRACT

A telescoping steering column is adapted to be supported by a vehicle structure. The telescoping steering column includes a jacket assembly and a jacket. The jacket is telescopically coupled to the jacket assembly along an axis. The jacket assembly and the jacket are adapted to collapse axially from a normal state to a collapsed state upon exertion of an axial force in a forward direction. The energy absorbing assembly includes a pin and a rupture member disposed axially adjacent to the pin. The pin is fixed to the jacket assembly and extends radially with respect to the axis and through a first opening defined by the jacket. The rupture member is part of the jacket, defines at least in-part first and second openings in the jacket. The rupture member is adapted to break as the jacket assembly and the jacket move from the normal state to the collapsed state.

16 Claims, 7 Drawing Sheets

(56) References Cited

U.S. PATENT DOCUMENTS

| | | | | |
|---|---|---|---|---|
| 8,627,742 | B2* | 1/2014 | Ridgway | B62D 1/192 |
| | | | | 74/493 |
| 8,967,017 | B2* | 3/2015 | Osawa | B62D 1/184 |
| | | | | 74/495 |
| 8,991,865 | B2* | 3/2015 | Randle | B62D 1/195 |
| | | | | 280/777 |
| 9,187,116 | B2* | 11/2015 | Yokota | B62D 1/195 |
| 9,399,483 | B2* | 7/2016 | Okada | F16M 13/02 |
| 9,421,995 | B2* | 8/2016 | Johta | B62D 1/184 |
| 9,637,161 | B2* | 5/2017 | Orihara | B62D 1/195 |
| 9,789,897 | B2* | 10/2017 | Yamamoto | B62D 1/192 |
| 10,160,475 | B2* | 12/2018 | Uesaka | B62D 1/189 |
| 10,377,408 | B2* | 8/2019 | Strong | B62D 1/192 |
| 10,464,590 | B2* | 11/2019 | Stinebring | B62D 1/181 |
| 10,683,029 | B2* | 6/2020 | Kwon | B62D 1/185 |
| 2007/0068311 | A1* | 3/2007 | Shimoda | B62D 1/184 |
| | | | | 74/493 |
| 2015/0251684 | A1* | 9/2015 | Chiba | B62D 1/195 |
| | | | | 74/493 |
| 2018/0057037 | A1* | 3/2018 | Abe | B62D 1/185 |
| 2019/0283793 | A1* | 9/2019 | Matsuno | B62D 1/192 |
| 2020/0031382 | A1* | 1/2020 | Strong | B62D 1/195 |
| 2020/0172148 | A1* | 6/2020 | Schnitzer | B62D 1/192 |

FOREIGN PATENT DOCUMENTS

| | | | | | |
|---|---|---|---|---|---|
| GB | 2365826 | A | * | 2/2002 | B62D 1/195 |
| JP | 2019156334 | A | * | 9/2019 | B62D 1/181 |

* cited by examiner

ENERGY ABSORBING ASSEMBLY OF A TELESCOPING STEERING COLUMN

CROSS-REFERENCES TO RELATED APPLICATIONS

This patent application claims priority to U.S. Provisional Patent Application Ser. No. 62/651,455, filed Apr. 2, 2018 which is incorporated herein by reference in its entirety.

BACKGROUND OF THE INVENTION

The present disclosure relates to a telescoping steering column, and more particularly, to an energy absorbing assembly of the telescoping steering column.

Steering columns are known to include at least two jackets adapted to retract and extend telescopically along an axis, typically for the convenience and comfort of an operator of the vehicle. Energy absorbing straps are used to absorb energy as a steering column collapses axially during an unusual event.

Enhancements to energy absorbing devices is desirable. Furthermore, more recent advancements in steering columns is amendable to such energy absorbing device improvements.

SUMMARY OF THE INVENTION

A telescoping steering column according to one, non-limiting, exemplary embodiment of the present disclosure is adapted to be supported by a vehicle structure. The telescoping steering column includes a jacket assembly and a jacket. The jacket is telescopically coupled to the jacket assembly along an axis. The jacket assembly and the jacket are adapted to collapse axially from a normal state to a collapsed state upon exertion of an axial force in a forward direction. The energy absorbing assembly includes a pin and a rupture member disposed axially adjacent to the pin. The pin is fixed to the jacket assembly and extends radially with respect to the axis and through a first opening defined by the jacket. The rupture member is part of the jacket, defines at least in-part first and second openings in the jacket. The rupture member is adapted to break as the jacket assembly and the jacket move from the normal state to the collapsed state.

A telescoping steering column according to another embodiment includes a first jacket, a mid jacket assembly, a second jacket, and an energy absorbing assembly adapted to absorb energy in an axial forward direction. The mid jacket assembly is telescopically coupled to the first jacket along an axis. The second jacket is telescopically coupled to the mid jacket assembly along the axis. The energy absorbing assembly is adapted to absorb energy in an axial forward direction, and includes a strap and a jacket deformation device. The strap extends between, and is fixed to, the first jacket and the mid jacket. The jacket deformation device is carried between the second jacket and the mid jacket assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a telescoping steering column 20 of the present disclosure may include an energy absorbing assembly 38 adapted to absorb energy in an axial direction. The telescoping steering column 20 is capable of selective adjustment and telescopic positioning, and may be capable of tilt-wise (i.e., rake) positioning. More specifically, the telescoping steering column 20 may be adapted to move axially between stowed and un-stowed states, and adjustably move axially between retracted and extended positions for user comfort and convenience. In one embodiment, the telescoping steering column 20 is adapted to move axially between the retracted and extended positions when in the un-stowed state, and may move from the un-stowed state and toward the stowed state when in the fully retracted position.

Figure 1:
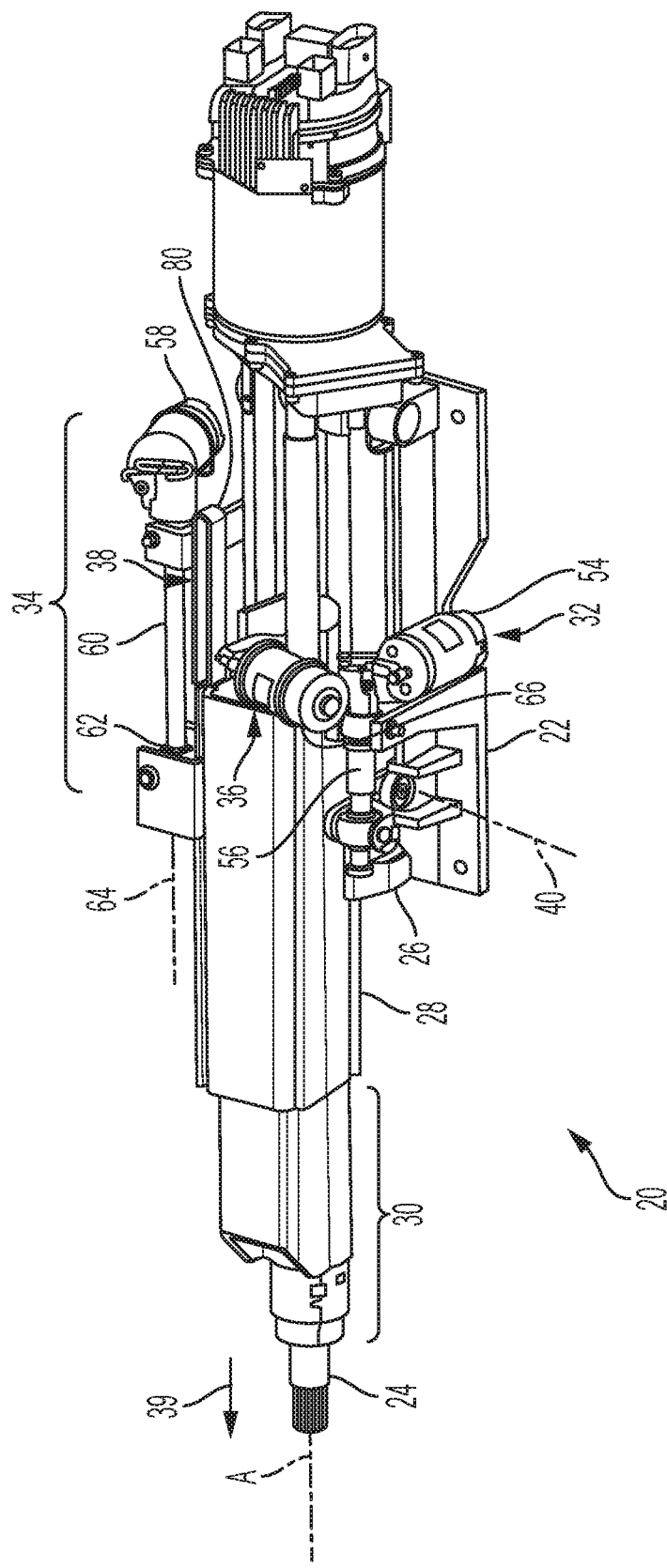
FIG. 1 is a perspective side view of a telescoping steering column in accordance with an exemplary embodiment of the present disclosure.
Figure 2:
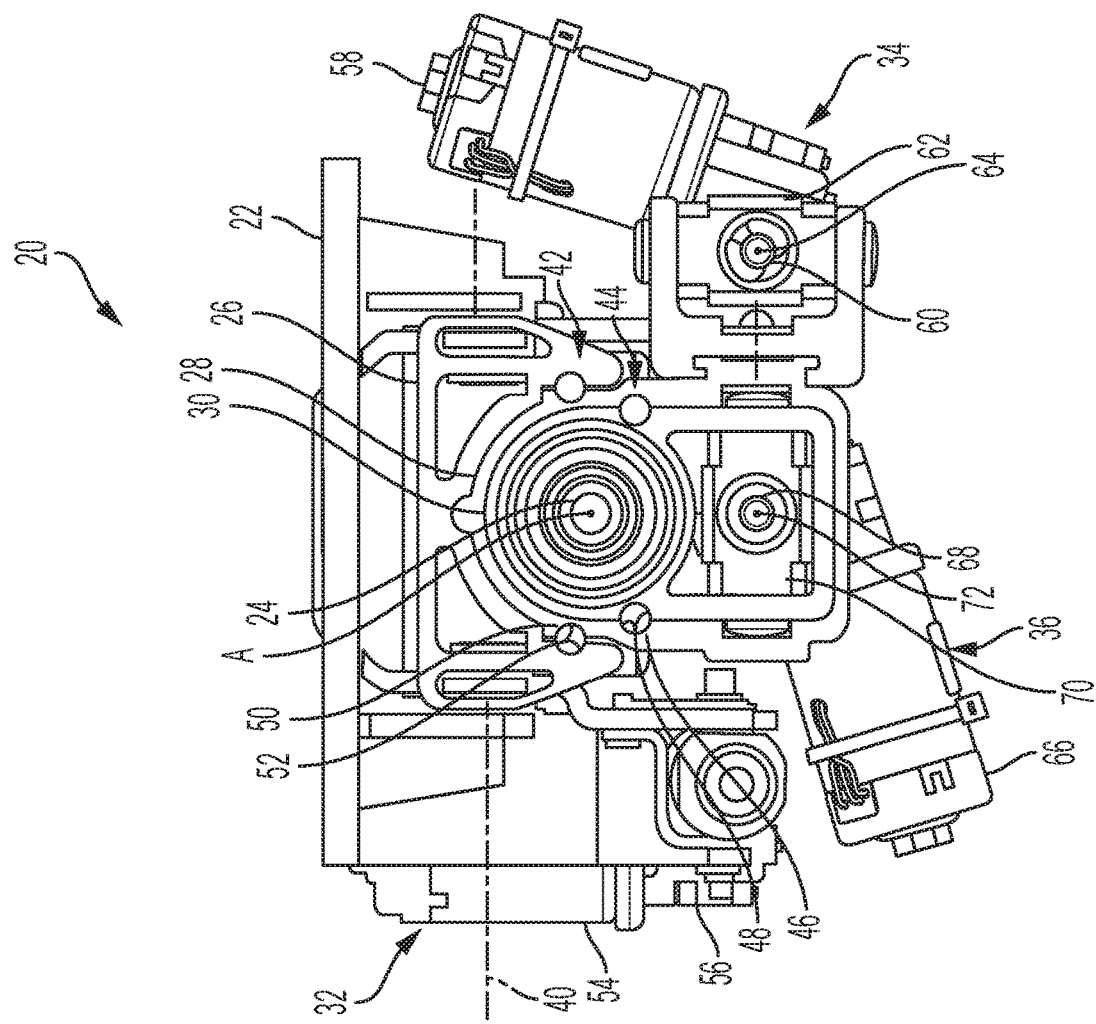
FIG. 2 is an end view of the telescoping steering column.

Referring to FIGS. 1 and 2, the telescoping steering column 20 is illustrated in the un-stowed state and in the extended position (i.e., nominal position). The telescopic positioning is generally for positioning a steering wheel (not shown) based on the comfort preferences of a driver (i.e., user) who has chosen to manually maneuver, or steer, the vehicle. In one embodiment, when the telescoping steering column 20 is in the stowed state, the driver has chosen not to drive the vehicle manually, and instead, the vehicle is maneuvering automatically (i.e., is in an autonomous mode). Preferably, when the telescoping steering column 20 is in the stowed state, the steering wheel is generally out of the way (i.e., not within comfortable reach) of vehicle occupants. In another embodiment, and for manually driven vehicles, the telescoping steering column 20 may not include stowed and un-stowed states.

The telescoping steering column 20 is attached to, and moves relative to, a vehicle structure 22 that may be, or may include, a bracket. In one embodiment, the vehicle structure 22 may be the undercarriage of a vehicle dash or console. The telescoping steering column 20 may include a steering shaft 24, a plurality of jackets (i.e., three illustrated as 26, 28, 30), a plurality of adjustment mechanisms (i.e., three illustrated as 32, 34, 36), an energy absorbing assembly 38, and a multitude of other components.

Although not illustrated, the steering shaft 24 may be axially collapsible via a splined connection, or other means, generally known in the art. The shaft 24 may further include a distal end portion projecting in a rearward direction (see arrow 39) with respect to the vehicle for attachment to a steering wheel (not shown). The steering shaft 24 may be supported by the jacket 30 (e.g., upper jacket) for rotation about a rotation axis A, and is adapted to axially extend and retract with the upper jacket 30. The upper jacket 30 may circumferentially extend continuously about the axis A and steering shaft 24, longitudinally extends along the axis A, may generally be located radially outward from the steering shaft 24, and may be tubular and/or extruded.

The upper jacket 30 may be slideably supported by the jacket 28 (e.g., mid jacket) for telescopic motion along the rotation axis A, and between the extended and retracted positions. The mid jacket 28 may be disposed radially outward from the upper jacket 30, may circumferentially extend continuously about the upper jacket 30, and may be tubular and/or extruded. With respect to a vehicle, the mid jacket 28 may be substantially located forward of the upper jacket 30 when in the extended position.

The mid jacket 28 may be slideably supported by the jacket 26 (e.g., lower jacket) for telescopic motion along the rotation axis A, and between the stowed and un-stowed states. That is, the lower jacket 26 has sufficient strength to support the jackets 28, 30 and at least a portion of the steering shaft 24. The lower jacket 26 may be generally located radially outward from the jacket 30, may be extruded, and in one embodiment, may be substantially located above the mid jacket 28. It is contemplated and understood that all three jackets 26, 28, 30 may be extruded (e.g., extruded aluminum), may be cylindrical, or may be a combination of both.

The lower jacket 26 may be pivotally engaged to the vehicle structure 22. More specifically, the lower jacket 26 is constructed and arranged to pivot about a pivot axis 40 that may be substantially normal to the rotation axis A. In one embodiment, the vehicle structure 22 and the pivot axis 40 may be disposed generally above the lower jacket 26, thus the pivot axis 40 is spaced radially outward from the rotation axis A. The pivoting motion of the lower jacket 26, which at least in-part carries the jackets 28, 30, steering shaft 24, and adjustment mechanisms 34, 36, may be a rake adjustment that may tilt (or raise and lower) a steering wheel for user convenience and comfort.

Referring to FIGS. 1 and 2, and in one embodiment, the telescoping steering column 20 may further include at least one ball-and-track arrangement (i.e. two illustrated as 42, 44, see FIG. 2) adapted to reduce friction when the telescoping steering column 20 telescopically moves between states and positions. Ball-and-track arrangement 42 may be generally carried between, and supported by, the lower jacket 26 and the mid jacket 28. Ball-and-track arrangement 44 may be generally carried between, and supported by, the mid jacket 28 and the upper jacket 30. The ball-and-track arrangement 42 may include a plurality of balls, or bearings, 50 adapted to ride within an axially extending grove 52 having boundaries defined by the jackets 26, 28. The ball-and-track arrangement 44 may include a plurality of balls, or bearings, 46 adapted to ride within an axially extending grove 48 having boundaries defined by the jackets 28, 30. The extruded design of the jackets 26, 28, 30 along with the design characteristics of the ball-and-track arrangements 42, 44 may optimize the telescoping steering column 20 stiffness and/or natural frequency response.

The adjustment mechanism 32 may be a rake adjustment mechanism adapted to enable pivotal movement about pivot axis 40, and between the lower jacket 26 and the vehicle structure, or bracket, 22. The adjustment mechanism 32 may include an electric motor 54 and any variety of a gear drive 56 adapted to transform the rotational, mechanical, displacement of a motor shaft to a rake adjustment displacement.

The adjustment mechanism 34 may be a stow adjustment mechanism adapted to telescopically move the mid jacket 28 with respect to the lower jacket 26. The adjustment mechanism 34 may include an electric motor 58, a leadscrew 60, and a threaded nut 62 (i.e., shuttle). The leadscrew 60 extends along a rotation axis 64, and may be threaded through the nut 62. The electric motor 58 may be rigidly mounted and/or fixed to the jacket 26, and is adapted to rotationally drive the leadscrew 60 about the axis 64. The nut 62 may be engaged to the mid jacket 28, and is adapted to threadably ride upon the leadscrew 60 when the leadscrew is rotated by the motor 58.

The adjustment mechanism 36 may be a user specific adjustment mechanism adapted to telescopically move the upper jacket 30 with respect to the mid jacket 28. The adjustment mechanism 36 may include an electric motor 66, a leadscrew 68, and a threaded nut 70 (i.e., shuttle). The leadscrew 68 extends along a rotation axis 72, and may be threaded through the nut 70. The electric motor 66 may be rigidly mounted and/or fixed to the jacket 28, and is adapted to rotationally drive the leadscrew 68 about the axis 72. The nut 70 may be engaged to the upper jacket 30, and is adapted to threadably ride upon the leadscrew 68 when the leadscrew is rotated by the motor 66.

Figure 3:
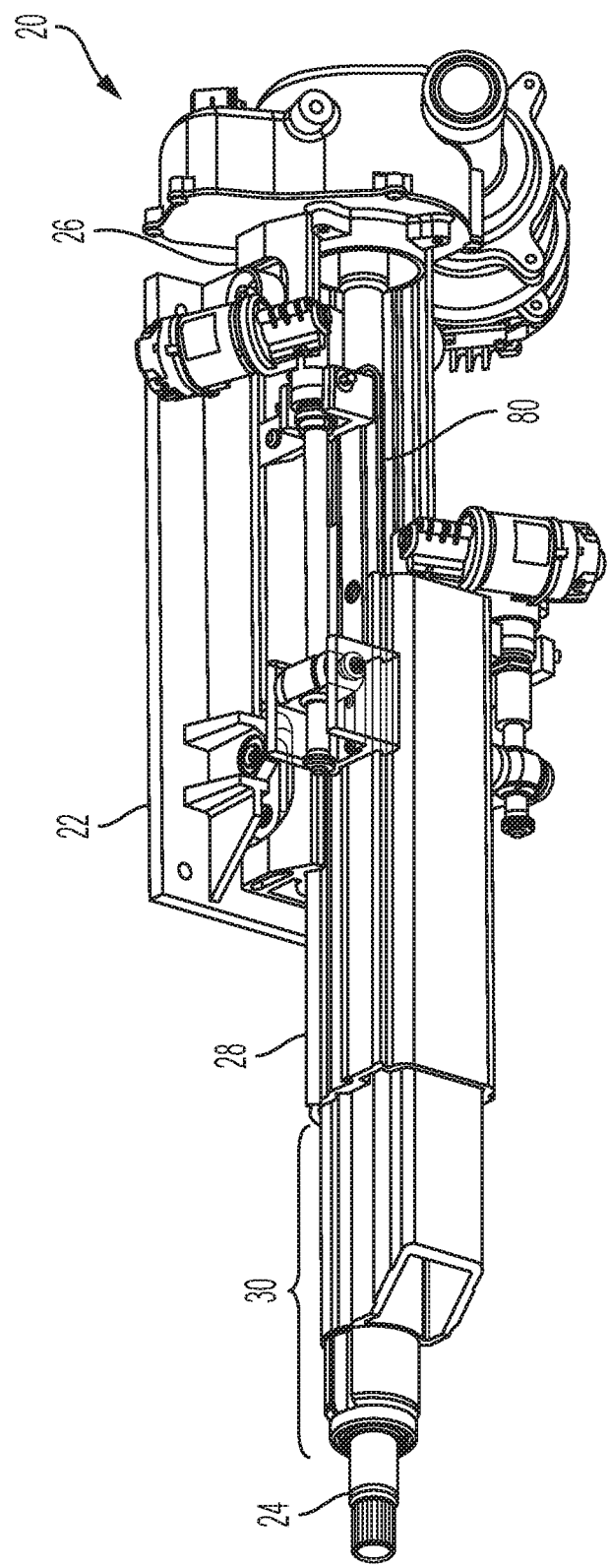
FIG. 3 is another perspective side view of the telescoping steering column.
Figure 4:
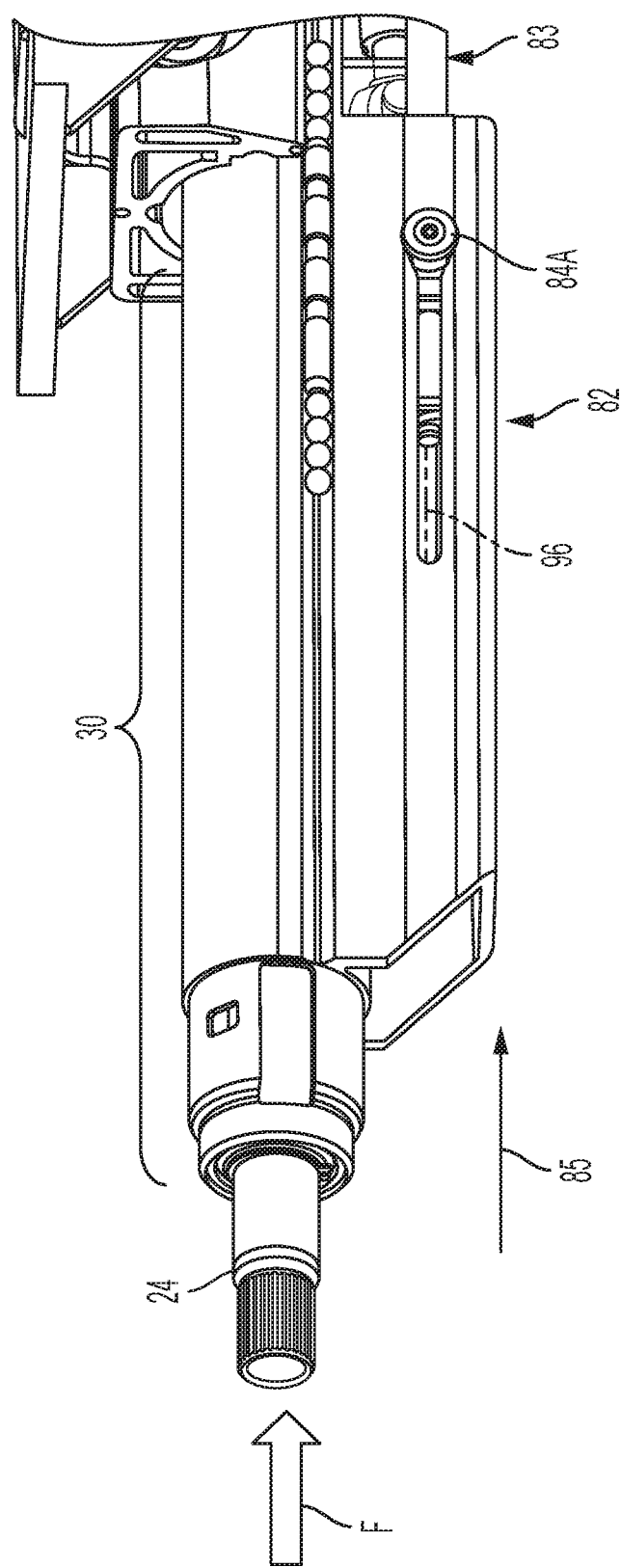
FIG. 4 is another perspective side view of the telescoping steering column in a normal state and with a mid jacket removed to show internal detail.
Figure 5:
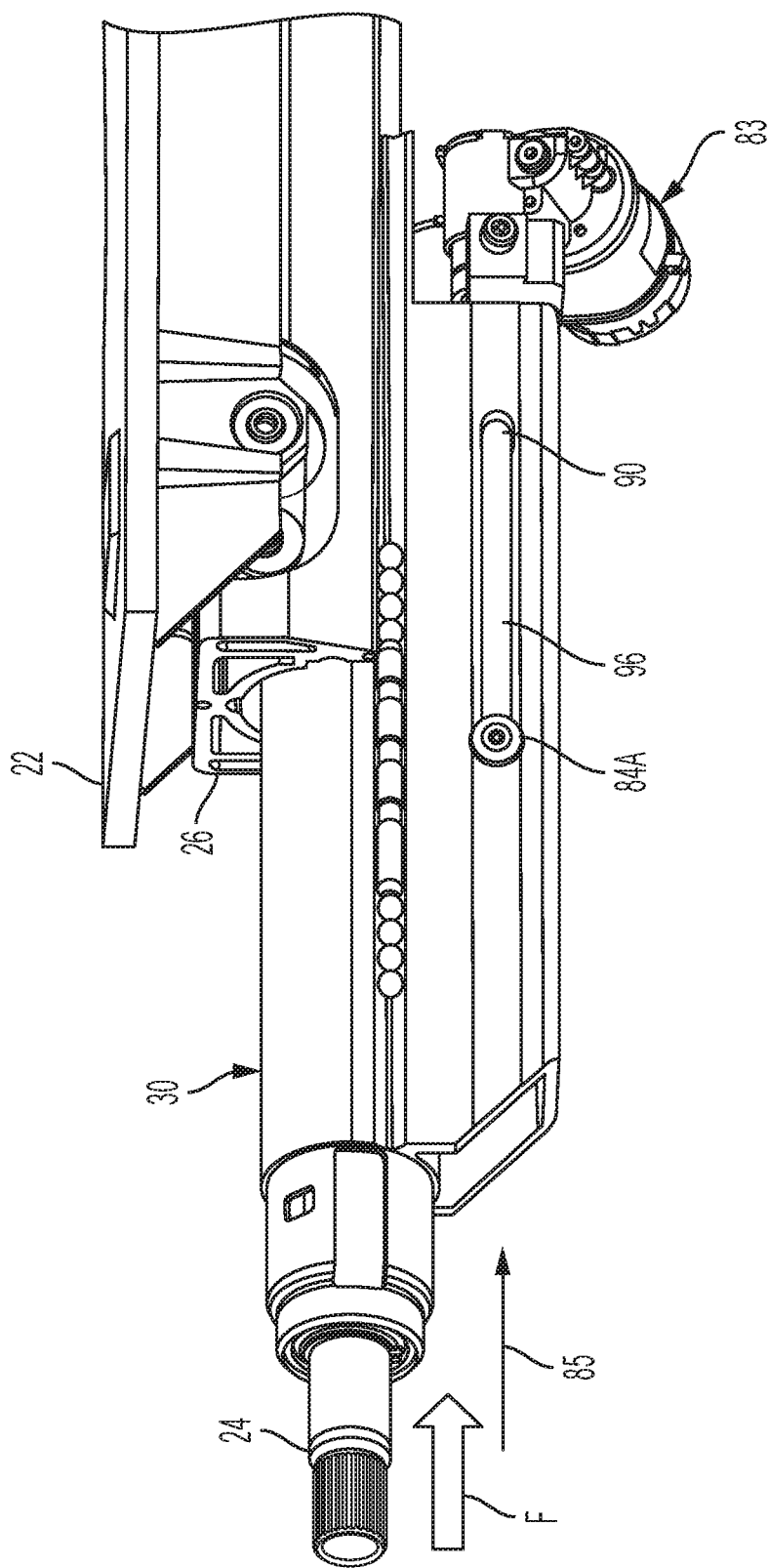
FIG. 5 is a side view of the telescoping steering column similar in perspective to FIG. 4, but illustrated in a collapsed state and with the mid jacket removed to show internal detail.
Figure 6:
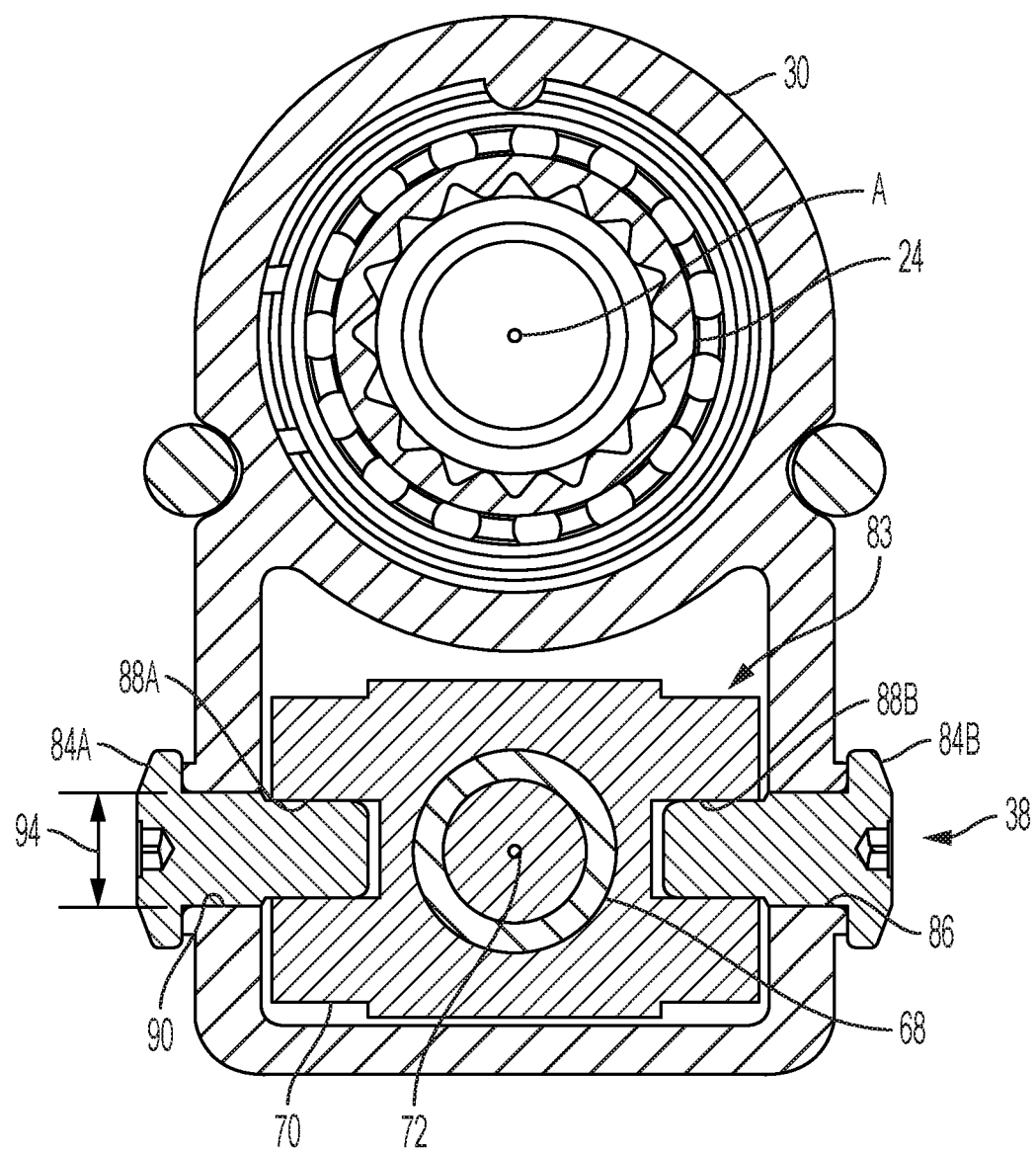
FIG. 6 is another cross section of the telescoping steering column assembly illustrating a jacket deformation device of an energy absorbing assembly.
Figure 7:
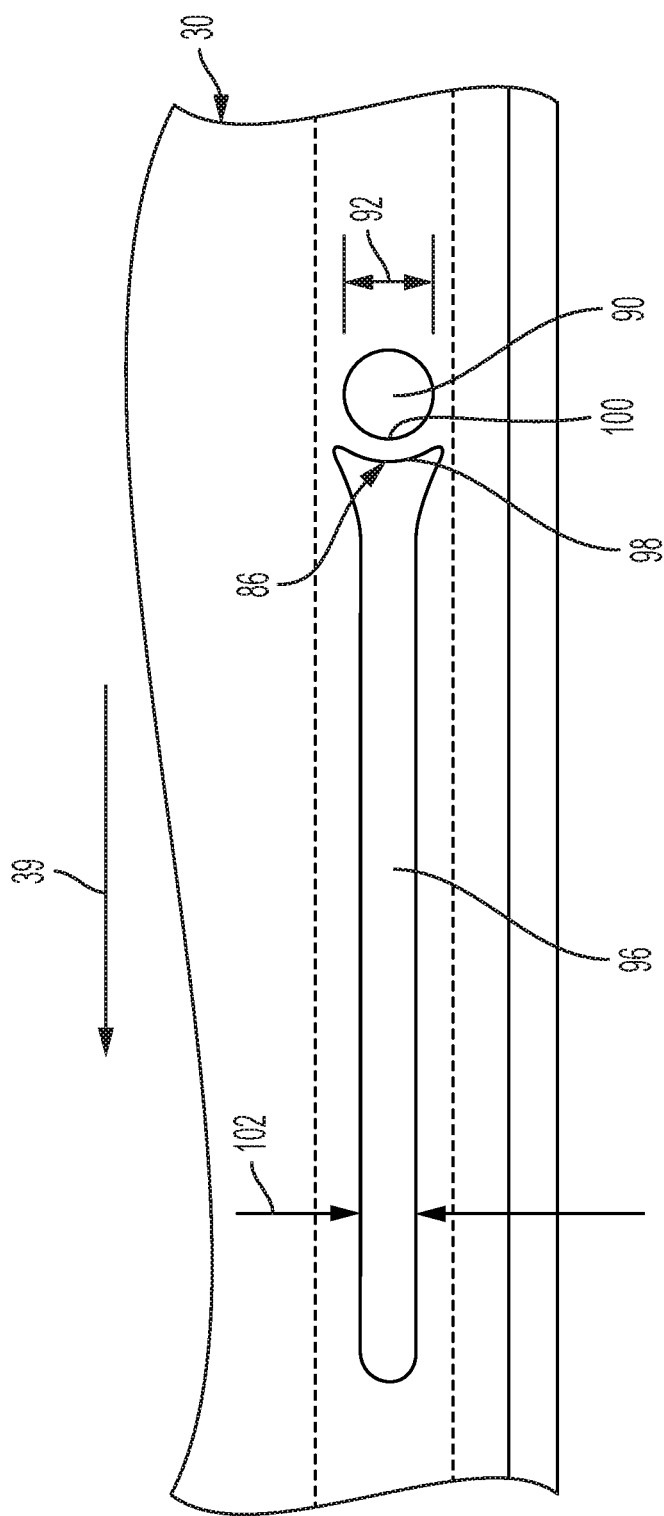
FIG. 7 is a partial side view of an upper jacket of the telescoping steering column assembly illustrating a rupture member of the jacket deformation device.

The energy absorbing assembly 38 includes an energy absorbing strap 80 (see FIGS. 1 and 3), and a jacket deformation device 82 (see FIGS. 4-6). In one example, the energy absorbing strap 80 is carried between the lower jacket 26 and the mid jacket 28, and the jacket deformation device 82 is generally carried between the upper jacket 30 and a mid jacket assembly 83 that includes the mid jacket 28 and the adjustment mechanism 36. In another embodiment, the placement of the strap 80 and the device 82 is reversed. In yet another embodiment, the energy absorbing assembly 38 does not include the energy absorbing strap 80.

The energy absorbing strap 80 is U-shaped and generally extends axially with respect to axis A. A first end of the strap 80 is fixed to the lower jacket 26 and an opposite second end is fixed to the mid jacket 28. The energy absorbing strap 80 functions as is generally known by one skilled in the art.

Referring to FIGS. 4-7, and in one example, the jacket deformation device 82 includes at least one pin (i.e., two opposing pins 84A, 84B are illustrated) and at least one rupture member 86 (i.e., one rupture member associated with each pin 84A, 84B). The pins 84A, 84B may be fixed too, and project radially outward from, the nut 70 of the adjustment mechanism 36 of the mid jacket assembly 83. More specifically, the pin 84A projects radially outward in a first direction, and the pin 94A projects radially outward in a substantially opposite second direction. Because the nut 70 is attached to the leadscrew 68, which is attached to the motor 66 that in-turn is fixed to the mid jacket 28 of the mid jacket assembly 83, the pins 84A, 84B are generally fixed to the mid jacket 28 as the jackets 28, 30 move from a normal state (see FIG. 4) to a collapsed state (see FIG. 5). The pins 84A, 84B are generally illustrated as bolts that thread into respective bores 88A, 88B in the nut 70. In another embodiment, the pins are clevis pins.

For simplicity of explanation, other features with respect to the first pin 84A shall be described, but with the understanding that the second pin 84B is associated with similar features. During the normal state, the pin 84A extends substantially radially outward from the nut 70 (i.e., or mid jacket 28), and through an opening 90 defined by the upper jacket 30. In one embodiment, the opening 90 may be a hole having a diameter (see arrow 92 in FIG. 7) that is substantially equal to, or slightly greater than, a diameter (see arrow 94 in FIG. 6) of the pin 84A.

The jacket deformation device 82 may include, or the pin 84A is associated with, an opening 96 that may be an axially extending slot. The opening 96 may be disposed axially rearward of the opening 90 and with respect to the vehicle. The rupture member 86 is located axially between the openings 90, 96. More specifically, the rupture member 86 includes a rearward side 98 that defines, in-part, the opening 96, and an opposite forward side 100 that defines, in-part, the opening 90. In one embodiment, the rupture member 86 is bridge-like and generally extends circumferentially with respect to the opening 90, and includes opposite ends fixed to the upper jacket 30. In one embodiment, the rupture member 86 is an integral part of the upper jacket 30 with the openings 90, 96, and thus the rupture member 86 being machined into the jacket 30. In another embodiment, the rupture member 86 may be removably attached to the jacket 30. It is contemplated and understood that the term "rupture" constitutes plastic deformation, or a breaking of the member 86 upon the application of a sufficient force F (see FIG. 5).

As illustrated, the energy absorbing strap 80 is attached to, and carried between, the lower and mid jackets 26, 28, and the jacket deformation device 82 is carried between the upper jacket 30 and the mid jacket assembly 83. However, the arrangement of the strap 80 and the device 82 may be generally reversed between jackets. Yet other embodiments may include one or both of the strap 80 and the device 82 being carried between the upper jacket 30 and the lower jacket 26, and/or the mid jacket 28 and the lower jacket 26. In another embodiment, the energy absorbing assembly 38 may not include an energy absorbing strap.

In operation, an axially directed force F (see FIG. 4) may be exerted upon the steering wheel causing the energy absorption assembly 38 to actuate, moving from a normal state (see FIG. 4) to a collapsed state (see FIG. 5). More specifically, the energy absorbing strap 80 plastically deforms (not shown) as the mid jacket 28 telescopically moves in an axial forward direction (see arrow 85 in FIG. 4) and generally into the lower jacket 26. Also upon application of force F, the rupture member 86 experiences an initial breakaway load causing the member 86 to break as the upper jacket 30 collapses axially into the mid jacket 28. With continuance of this collapse, the pins 84A, 84B move out of the respective openings 90 and into the openings, or slots, 96. During this collapse, the nut 70 remains rigid (i.e., fixed) to the leadscrew 68, and the leadscrew 68 remains fixed to the mid jacket 28.

In one example and because each slot 96 has a width (see arrow 102 in FIG. 7) that is less than the diameter 94 of the pins 84A, 84B, the upper jacket 30 undergoes plastic deformation as the pins 84A, 84B travel along the slots 96 (i.e., a running load).

Advantages and benefits of the present disclosure include a telescoping steering column having greater telescope/stow distances than more traditional columns without increasing noise, vibration, and harshness concerns due to more traditional lengthy cantilever distances. Also, because single telescope/stow mechanisms are generally not applied, the column mounting locations may be more rearward in the vehicle thus enabling use of pre-existing, or more common, mounting points on a vehicle platform. Yet further, the three jacket design provides improved packaging when compared to a two jacket design.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A telescoping steering column adapted to be supported by a vehicle structure, the telescoping steering column comprising:
   a jacket assembly;
   a jacket telescopically coupled to the jacket assembly along an axis, the jacket assembly and the jacket adapted to collapse axially from a normal state to a collapsed state upon exertion of an axial force in a forward direction;
   an energy absorbing assembly including a pin and a rupture member disposed axially adjacent to the pin, the pin being fixed to the jacket assembly and extending radially with respect to the axis and through a first opening defined by the jacket, and the rupture member being part of the jacket, defining at least in-part the first opening and defining at least in part a second opening in the jacket, the rupture member adapted to break as the jacket assembly and the jacket move from the normal state to the collapsed state;
   wherein the jacket is an upper jacket, and the jacket assembly includes a second jacket and an adjustment mechanism fixed to the second jacket, and the pin is fixed to the adjustment mechanism; and
   wherein the adjustment mechanism includes an electric motor fixed to the second jacket, and a lead screw rotatably driven by the motor, and a nut threadably mounted to the leadscrew for telescopically moving the upper jacket with respect to the second jacket, and the pin is fixed to the nut.

2. The telescoping steering column set forth in claim 1, wherein the pin moves from the first opening and into the second opening as the jacket assembly and the jacket move from the normal state to the collapsed state.

3. The telescoping steering column set forth in claim 2, wherein the first opening is a hole and the second opening is a slot extending axially.

4. The telescoping steering column set forth in claim 3, wherein the slot has a width that is less than a diameter of the pin.

5. The telescoping steering column set forth in claim 4, wherein the jacket is made of a material that is softer than a material of the pin.

6. The telescoping steering column set forth in claim 5, wherein the material of the jacket is extruded aluminum and the material of the pin is steel.

7. The telescoping steering column set forth in claim 1, wherein the pin is a bolt that threads into the jacket assembly.

8. The telescoping steering column set forth in claim 1, wherein the rupture member is bridge-like extending circumferentially and defining in-part the first opening, and including opposite end portions each connected to the jacket.

9. The telescoping steering column set forth in claim 1, wherein the jacket is made of a material that is softer than the pin.

10. A telescoping steering column adapted to be supported by a vehicle structure, the telescoping steering column comprising:
   a first jacket;
   a mid jacket assembly telescopically coupled to the first jacket along an axis;
   a second jacket telescopically coupled to the mid jacket assembly along the axis; and
   an energy absorbing assembly adapted to absorb energy in an axial forward direction, the energy absorbing assembly including:
   an energy absorbing strap extending between and fixed to the first jacket and the mid jacket, and
   a jacket deformation device carried between the second jacket and the mid jacket assembly.

11. The telescoping steering column set forth in claim 10, wherein the jacket deformation device includes a pin fixed to the mid jacket assembly and extending radially through the second jacket, and an axially extending slot defined by the second jacket for receipt of the pin when the first and second jackets axially collapse and move from a normal state to a collapsed state.

12. The telescoping steering column set forth in claim 11, wherein the slot has a width that is less than a diameter of the pin, and the second jacket is adapted to undergo plastic deformation along the slot as the pin enters the slot when the telescoping steering column moves from a normal state to a collapsed state.

13. The telescoping steering column set forth in claim 12, wherein the jacket deformation device includes a rupture member including a forward side defining at least in part a hole and a rearward side defining in part the slot, and the pin extends through the hole when in the normal state and ruptures the rupture member when moving from the normal state to the collapsed state.

14. The telescoping steering column set forth in claim 11, wherein the mid jacket assembly includes a mid jacket, an electric motor fixed to the mid jacket, a leadscrew rotatably driven by the electric motor, and a shuttle threadably mounted to the leadscrew, and wherein the pin is fixed to the shuttle.

15. The telescoping steering column set forth in claim 10, wherein the first jacket is a lower jacket and the second jacket is an upper jacket.

16. A telescoping steering column adapted to be supported by a vehicle structure, the telescoping steering column comprising:
   a jacket assembly;
   a jacket telescopically coupled to the jacket assembly along an axis, the jacket assembly and the jacket adapted to collapse axially from a normal state to a collapsed state upon exertion of an axial force in a forward direction;
   an energy absorbing assembly including a pin and a rupture member disposed axially adjacent to the pin, the pin being fixed to the jacket assembly and extending radially with respect to the axis and through a first opening defined by the jacket, and the rupture member being part of the jacket, defining at least in-part the first opening and defining at least in part a second opening in the jacket, the rupture member adapted to break as the jacket assembly and the jacket move from the normal state to the collapsed state;
   wherein the jacket is an upper jacket, and the jacket assembly includes a second jacket and an adjustment mechanism fixed to the second jacket, and the pin is fixed to the adjustment mechanism;
   a lower jacket telescopically arranged with the upper jacket and the second jacket, the second jacket being a mid jacket; and
   an energy absorption strap extending between and fixed to the mid jacket and the lower jacket.

\* \* \* \* \*